United States Patent
Kang et al.

(10) Patent No.: US 11,746,218 B2
(45) Date of Patent: Sep. 5, 2023

(54) WATER-EXPANDABLE RUBBER COMPOSITION AND WATER-EXPANDABLE RUBBER PAD COMPRISING SAME

(71) Applicants: Hyundai Motor Company, Seoul (KR); Kia Motors Corporation, Seoul (KR)

(72) Inventors: Jae Wook Kang, Gyeonggi-do (KR); Il Suk Yang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 353 days.

(21) Appl. No.: 17/036,906

(22) Filed: Sep. 29, 2020

(65) Prior Publication Data

US 2021/0332225 A1 Oct. 28, 2021

(30) Foreign Application Priority Data

Apr. 23, 2020 (KR) .................. 10-2020-0049287

(51) Int. Cl.
*C08L 15/00* (2006.01)
*C08L 23/08* (2006.01)
(Continued)

(52) U.S. Cl.
CPC .............. *C08L 15/005* (2013.01); *C08K 3/04* (2013.01); *C08K 3/36* (2013.01); *C08K 5/0025* (2013.01);
(Continued)

(58) Field of Classification Search
None
See application file for complete search history.

(56) References Cited

U.S. PATENT DOCUMENTS

2004/0266938 A1* 12/2004 Tokumitsu ............. F16J 15/102
524/495
2013/0274397 A1* 10/2013 Choi ....................... C08L 71/02
507/224
(Continued)

FOREIGN PATENT DOCUMENTS

JP 10172358 A * 6/1998
JP 2000327857 A * 11/2000
(Continued)

OTHER PUBLICATIONS

JP-10172358-A, Jun. 1998, machine translation (Year: 1998).*
JP-2000327857-A, Nov. 2000, machine translation (Year: 2000).*

*Primary Examiner* — Satya B Sastri
(74) *Attorney, Agent, or Firm* — Fox Rothschild LLP (57) ABSTRACT

Disclosed are a water-expandable rubber composition and a water-expandable rubber pad including the same. The water-expandable rubber pad manufactured using the water-expandable rubber composition is rigid enough to be directly inserted into a cylinder jacket even without a metal plate, etc. Moreover, the water-expandable rubber pad may increase in volume upon contact with engine coolant, thereby being optimized for an assembly process and facilitating design. Thus, since no separate assembly parts are used compared to conventional cases, the number of parts can be reduced, and costs can be reduced, and adhesiveness of the rubber pad is superior to that of conventional foam rubber and thus heat retention performance is excellent, resulting in improved engine fuel efficiency.

13 Claims, 2 Drawing Sheets

(51) Int. Cl.
    *C08L 33/08*     (2006.01)
    *C08K 3/04*     (2006.01)
    *C08K 3/36*     (2006.01)
    *C08K 5/00*     (2006.01)
    *C08K 5/3437*     (2006.01)
    *C08K 5/3465*     (2006.01)
    *C08K 5/10*     (2006.01)
    *C08K 5/092*     (2006.01)
    *C08K 5/205*     (2006.01)
    *C08K 5/18*     (2006.01)
    *F01P 3/02*     (2006.01)
    *C08L 9/02*     (2006.01)

(52) U.S. Cl.
CPC ............... *C08K 5/092* (2013.01); *C08K 5/10* (2013.01); *C08K 5/18* (2013.01); *C08K 5/205* (2013.01); *C08K 5/3437* (2013.01); *C08K 5/3465* (2013.01); *C08L 9/02* (2013.01); *C08L 23/08* (2013.01); *C08L 33/08* (2013.01); *F01P 3/02* (2013.01); *C08K 2201/005* (2013.01); *C08K 2201/006* (2013.01)

(56) References Cited

U.S. PATENT DOCUMENTS

| | | | |
|---|---|---|---|
| 2014/0087977 A1* | 3/2014 | Kim | C09K 8/50 507/224 |
| 2016/0376415 A1* | 12/2016 | Kang | C08K 5/098 523/220 |
| 2017/0009051 A1* | 1/2017 | Shiono | C08K 5/13 |
| 2017/0015824 A1* | 1/2017 | Gozalo | C08L 33/18 |

FOREIGN PATENT DOCUMENTS

| | | | | |
|---|---|---|---|---|
| KR | 101717183 B1 | 3/2017 | | |
| WO | WO-2017011655 A1 * | 1/2017 | ............. | C08L 33/18 |

* cited by examiner

WATER-EXPANDABLE RUBBER COMPOSITION AND WATER-EXPANDABLE RUBBER PAD COMPRISING SAME

CROSS REFERENCE TO RELATED APPLICATION

The present application claims priority based on Korean Patent Application No. 10-2020-0049287, filed on Apr. 23, 2020, the entire content of which is incorporated herein for all purposes by this reference.

TECHNICAL FIELD

The present invention relates to a water-expandable rubber composition, which may be directly applied to a cylinder jacket to thus increase in volume upon contact with coolant, and a water-expandable rubber pad including the same.

BACKGROUND OF THE INVENTION

A conventional rubber pad applied to a cylinder jacket insert has been manufactured from foam and has been used to reduce friction loss between a cylinder and a piston through separate upper and lower cooling of the cylinder. However, the rubber pad includes a metal plate able to fix the same to a plastic body in order to withstand the flow of coolant. Moreover, in order to apply the rubber pad to the cylinder jacket, a complicated structure and assembly process are required, so manufacturing costs are high, and moreover, the rubber pad may be damaged due to aging upon long-term use, which is a material and structural defect from a durability point of view. With the goal of solving such problems, a solid-type rubber pad that may be directly assembled on a plastic body is required.

SUMMARY

In preferred aspects, provided are a water-expandable rubber composition capable of increasing in volume upon contact with coolant and including a base resin including hydrogenated nitrile butadiene rubber (HNBR) or ethylene-acrylic rubber (AEM), a waterstop resin and a filler; and a water-expandable rubber pad including the same, which may have a volume expansion rate of 100 to 150%.

The term "a water-expandable rubber" as used herein refers to a rubber component capable of expand or increase in volume or size upon contacting with water or moisture. For example, the water-expandable rubber may increase its volume by about 10%, 20%, 30%, 40%, 50%, 60%, 70%, 80%, 90%, 100%, 110%, 120%, 130%, 140%, 150%, 160%, 170%, 180%, 190% or 200%, or preferably by 100% to 150%. For example, the water-expandable rubber may have excellent water absorption and be water-swellable. The term "waterstop resin" as used herein refers a resin or polymer component having one or more strong functional groups or ions in repeating polymeric unit. For example, upon contact with water or moisture, each unit of the polymeric structure may interact and absorb the water so as to remove the water from the surroundings. Exemplary waterstop resin may include sodium polyacrylates, which may absorb and retain 100 to 1000 times its mass of water.

In an aspect, provided is a water-expandable rubber composition including 100 parts by weight of a base resin, an amount of about 90 to 120 parts by weight of a waterstop resin, and an amount of about 18 to 22 parts by weight of a filler. Preferably, the base resin may include hydrogenated nitrile butadiene rubber (HNBR) or ethylene-acrylic rubber (AEM).

The hydrogenated nitrile butadiene rubber (HNBR) may suitably include an amount of about 16 to 20 mass % of acrylonitrile (AN) based on the total mass of the hydrogenated nitrile butadiene rubber (HNBR), and may have a hydrogen saturation rate of about 80 to 99 mass %.

The hydrogenated nitrile butadiene rubber (HNBR) may have a glass transition temperature of about −35 to −40° C. and a Mooney viscosity (ML1+4, 100° C.) of about 67 to 73 dl/g.

The waterstop resin may suitably include an alkali-metal-polyacrylate-based polymer. For example, the waterstop resin may is a sodium salt of polyacrylic having a formula $[-CH_2-CH(CO_2Na)-]_n$.

The waterstop resin may suitably have a particle size of about 3 to 10 μm.

The filler may suitably include carbon black.

The filler may suitably have an average particle size of about 30 to 40 nm, a specific surface area of about 65 to 70 $m^2/g$, urea adsorption of about 90 to 95 mg/g, and an apparent density of about 0.02 to 0.06 g/mL.

The water-expandable rubber composition may further include, based on 100 parts by weight of the base resin, an amount of about 0.5 to 2.0 parts by weight of a crosslinking agent, an amount of about 2.0 to 5.0 parts by weight of a crosslinking accelerator, an amount of about 0.5 to 2.0 parts by weight of a processing aid, and an amount of about 4.0 to 10 parts by weight of an anti-aging agent.

The crosslinking agent may suitably include an amount of about 40 to 60 wt % of 1,8-diazabicyclo[5.4.0]undec-7-ene, an amount of about 20 to 30 wt % of aliphatic dibasic acid, and an amount of about 20 to 30 wt % of silicon dioxide, based on the total weight of the crosslinking agent.

The crosslinking accelerator may suitably include hexamethylenediamine carbamate (HMDC).

The processing aid may suitably include stearic acid.

The anti-aging agent may suitably include quinoline and p-phenylenediamine at a mass ratio of about 1:0.75 to 1.25.

In an aspect, provided is a water-expandable rubber pad including the water-expandable rubber composition described herein. the water expandable rubber pad may have a volume expansion rate of about 100 to 150%, a Shore hardness of about 83 to 95 HS, tensile strength of about 5 to 15 MPa, and elongation of about 220 to 560%.

Preferably, the water-expandable rubber pad may be used for an engine water jacket.

Other aspects of the inventions are disclosed infra.

According to various exemplary embodiments of the present invention, a water-expandable rubber pad manufactured using a water-expandable rubber composition may be rigid enough to be directly inserted into a cylinder jacket even without a metal plate, etc. Moreover, the water-expandable rubber pad may increase in volume upon contact with engine coolant, thereby being optimized for an assembly process and facilitating design. Thus, since no separate assembly parts are used compared to conventional cases, the number of parts can be reduced and costs can be reduced, and adhesiveness of the rubber pad is superior to that of conventional foam rubber, and thus heat retention performance is excellent, resulting in improved engine fuel efficiency.

The effects of the present invention are not limited to the foregoing, and should be understood to include all effects that can be reasonably anticipated from the following description.

Other aspects of the inventions are disclosed infra.

DETAILED DESCRIPTION

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Water-Expandable Rubber Composition

The water-expandable rubber composition is not particularly limited, so long as it is a composition that constitutes, among vehicle parts, parts capable of improving engine fuel efficiency due to excellent heat retention performance while increasing in volume, thereby being optimized for an assembly process and facilitating design, without deterioration of properties thereof even in high-moisture environments or the like.

In an aspect, the water-expandable rubber composition ("composition") may include 100 parts by weight of a base resin, a waterstop resin, and a filler, and preferably further includes a crosslinking agent, a crosslinking accelerator, a processing aid, and an anti-aging agent. Thus, the water-expandable rubber composition may include 100 parts by weight of a base resin, an amount of about 90 to 120 parts by weight of a waterstop resin, and an amount of about 18 to 22 parts by weight of a filler. The composition may further include based on 100 parts by weight of the base resin, an amount of about 0.5 to 2.0 parts by weight of a crosslinking agent, an amount of about 2 to 5 parts by weight of a crosslinking accelerator, an amount of about 0.5 to 2 parts by weight of a processing aid, and an amount of about 4 to 10 parts by weight of an anti-aging agent.

(1) Base Resin

The base resin is not particularly limited, so long as it is a resin having properties capable of withstanding cylinder jacket conditions.

The base resin may include a typical resin, for example, one or more rubbers selected from the group consisting of hydrogenated nitrile butadiene rubber (HNBR), ethylene-acrylic rubber (AEM), ACM (acrylic rubber), EPDM (ethylene propylene rubber) and FKM (fluorocarbon rubber). The base resin is not limited to including particular rubber, and may preferably include HNBR or AEM, which is a resin having properties capable of withstanding the conditions of a cylinder jacket to which a rubber pad including a water-expandable rubber composition composed of the base resin may be applied, in particular, a temperature of about −30 to 150° C.

Particularly, hydrogenated nitrile butadiene rubber (HNBR) may be a rubber type imparted with increased heat resistance by hydrogenating a double bond present in the acrylonitrile butadiene rubber (NBR) molecule and its structure of NBR is represented by Chemical Formula 1 below. NBR may have excellent resistance to oils because it is copolymerized using a polar monomer (acrylonitrile).

[Chemical Formula 1]

Nitrile rubber (NBR)

HNBR is a polymer in which the double bond of NBR is saturated by adding hydrogen to NBR. The structure of HNBR is represented by Chemical Formula 2 below. It may be referred to as polymethylene having a nitrile side chain group. HNBR is excellent in heat resistance because the main chain thereof is highly saturated polymethylene.

[Chemical Formula 2]

Hydrogenated nitrile rubber (HNBR)

HNBR has good resistance to oils including acrylonitrile, and is excellent in heat resistance because the main chain thereof is polymethylene, making it suitable for use in a water-expandable composition.

The hydrogenated nitrile butadiene rubber (HNBR) may include an amount of about 16 to 20 mass % of acrylonitrile (AN) based on the total mass of the HNBR, and may have a hydrogen saturation rate of about 80 to 99 mass %, a glass transition temperature of about −35 to −40° C., and a Mooney viscosity (ML1+4, 100° C.) of about 67 to 73 dl/g. Here, 'hydrogen saturation rate' means how many double bonds are removed. Further, the '%' of hydrogen saturation rate refers to the ratio of repeating units in which double bonds are removed relative to all repeating units of HNBR. When the amount of AN is greater than 20 mass %, the low-temperature flexibility of a molded product made of the water-expandable rubber pad is insufficient, and thus, adhesiveness thereof to the wall surface of a water jacket may be weakened in the temperature range of about −30° C. to −40° C. Also, when the hydrogen saturation rate is less than about 80 mass %, the resulting product has difficulty withstanding the environmental conditions of the water jacket due to the lack of heat resistance. Also, when the Mooney viscosity is less than about 67 dl/g or greater than about 73 dl/g, processability, such as kneadability and moldability, may be deteriorated.

The ethylene-acrylic rubber (AEM) is a terpolymer of ethylene, methyl acrylate and a crosslinking monomer having a carboxylic acid group. This AEM rubber may be suitable for use in the water-expandable composition because heat resistance and compression resistance may be superior to those of acrylic copolymer rubber.

The ethylene-acrylic rubber (AEM) may have a glass transition temperature of about −33 to −38° C. and a Mooney viscosity of (ML1+4, 100° C.) of about 14 to 19 dl/g. When the glass transition temperature is less than about −33° C., the low-temperature flexibility of a molded product made of the water-expandable rubber pad may not be sufficient, and thus adhesiveness thereof to the wall surface of the water jacket may be weakened in the temperature range of about −30° C. to −40° C. Moreover, when the Mooney viscosity is less than about 14 dl/g or greater than about 19 dl/g, processability, such as kneadability or moldability, may be deteriorated.

The water-expandable rubber composition may include 100 parts by weight of the base resin, namely hydrogenated nitrile butadiene rubber (HNBR) or ethylene-acrylic rubber (AEM). The water-expandable rubber composition may suitably include the base resin, and thus advantageously may have properties capable of withstanding the conditions of a cylinder jacket, in particular, a temperature of about −30 to 150° C.

(2) Waterstop Resin

The waterstop resin is not particularly limited, so long as it is able to expand the volume of the rubber pad manufactured using the rubber composition including the same.

The waterstop may include a typical waterstop resin, for example, a hydrophilic polymer that may increase in volume by capturing external water through hydrogen bonding by the hydrophilic portion of the molecular structure, namely an alkali-metal-polyacrylate-based polymer, preferably sodium polyacrylate, capable of efficiently adjusting the maximum volume expansion rate of the rubber pad including the same.

A commercially available waterstop resin typically has a diameter of about 500 to 1,000 μm, and in order to maintain a uniform shape while flattening the surface of the rubber pad including the same, the diameter of the waterstop resin may be about 3 to 10 μm. When the diameter of the waterstop resin is less than about 3 μm, poor workability upon weighing or kneading and poor dispersibility in the compound may result. On the other hand, when the diameter thereof is greater than about 10 μm, the rate of expansion in water may decrease.

The amount of the waterstop resin may be about 90 to 120 parts by weight based on 100 parts by weight of the base resin. When the amount of the waterstop resin is less than about 90 parts by weight, adhesiveness to the wall surface of the water jacket after expansion of the rubber pad becomes insufficient. On the other hand, when the amount thereof is greater than about 120 parts by weight, adhesiveness may become excessive and thus the rubber pad may be damaged.

The water-expandable rubber composition and the water-expandable rubber pad including the same may include the waterstop resin in a specific amount, thus increasing the volume of the rubber pad, thereby being optimized for an assembly process and facilitating design, and moreover, no separate assembly parts are used compared to conventional cases. Thus, the number of parts may be reduced and costs may be reduced, and adhesiveness of the rubber pad may be superior to that of conventional foam rubber, and thus heat retention performance may be excellent, resulting in improved engine fuel efficiency.

(3) Filler

The filler is not particularly limited, so long as it is able to improve the mechanical properties of the rubber pad including the same, such as strength or toughness.

The filler include a typical filler useful in the rubber composition, for example, one or more selected from the group consisting of carbon black, silica and carbon fiber, and is not limited to a particular type, but carbon black, having good ability to reinforce the base resin, is preferably used. The filler may have an average particle size of about 30 to 40 nm, a specific surface area of about 65 to 70 $m^2/g$, urea adsorption of about 90 to 95 mg/g, and an apparent density of about 0.02 to 0.06 g/mL. When the average particle size of the filler is less than about 30 nm, poor workability upon weighing or kneading and poor dispersibility in the compound may result. On the other hand, when the average particle size thereof is greater than about 40 nm, mechanical properties such as tensile strength or elongation at breakage may be deteriorated. Also, when the specific surface area of the filler is less than about 65 $m^2/g$, reinforcement of the rubber compound may be deteriorated and thus the rigidity of the molded pad product may decrease. On the other hand, when the specific surface area thereof is greater than about 70 $m^2/g$, there is a risk of interfering with water expansion due to excessive reinforcement. Also, when the urea adsorption of the filler is less than about 90 mg/g, reinforcement of the rubber compound may be deteriorated and thus the rigidity of the molded pad product may decrease. On the other hand, when the urea adsorption thereof is greater than about 95 mg/g, there is a risk of interfering with water expansion due to excessive reinforcement. Also, when the apparent density of the filler is less than about 0.02 g/mL, poor workability upon weighing or kneading and poor dispersibility in the compound may result. On the other hand, when the apparent density thereof is greater than about 0.06 g/mL, mechanical properties such as tensile strength or elongation at breakage may be deteriorated.

(4) Crosslinking Agent

The crosslinking agent is not particularly limited, so long as it is able to form a crosslinkage between polymer chains when mixing components included in the rubber composition.

The crosslinking agent may be a typical crosslinking agent useful in rubber compositions. The crosslinking agent is not limited to including a particular component, but is preferably an amine-based crosslinking agent, and more preferably includes a mixture of about 40 to 60 wt % of 1,8-diazabicyclo[5.4.0]undec-7-ene, about 20 to 30 wt % of aliphatic dibasic acid, and about 20 to 30 wt % of silicon dioxide based on the total weight of the total weight of the crosslinking agent, which may enable an appropriate crosslinking reaction in consideration of processability and moldability.

The amount of the crosslinking agent according to the present invention may be about 0.5 to 2.0 parts by weight based on 100 parts by weight of the base resin. When the amount of the crosslinking agent is less than about 0.5 parts by weight, mechanical properties such as tensile strength or elongation at breakage may be deteriorated. On the other hand, when the amount thereof is greater than about 2.0 parts by weight, the crosslinking reaction may excessively increase, thus impeding water expansion or lowering the speed thereof.

(5) Crosslinking Accelerator

The crosslinking accelerator is not particularly limited, so long as it is able to increase the crosslinking capability of the crosslinking agent to thus reduce the crosslinking time. The crosslinking accelerator is a typical crosslinking accelerator, and is preferably HMDC.

The amount of the crosslinking accelerator may be about 2.0 to 5.0 parts by weight based on 100 parts by weight of the base resin. When the amount of the crosslinking accelerator is less than about 2.0 parts by weight, the molding time may increase. On the other hand, when the amount thereof is greater than about 5.0 parts by weight, the molding time may decrease.

(6) Processing Aid

The processing aid is not particularly limited, so long as it is able to aid the crosslinking agent. The processing aid is a typical processing aid useful in the present invention, and is preferably stearic acid.

The amount of the processing aid may be about 0.5 to 2.0 parts by weight based on 100 parts by weight of the base resin. When the amount of the crosslinking accelerator is less than about 0.5 parts by weight, processability may be deteriorated. On the other hand, when the amount thereof is greater than about 2.0 parts by weight, mechanical properties such as tensile strength or elongation at breakage may be deteriorated.

(7) Anti-Aging Agent

The anti-aging agent is not particularly limited, so long as it is able to prevent aging of the rubber pad due to internal and external factors. The anti-aging agent may be a typical anti-aging agent, and may suitably include quinoline and p-phenylenediamine. For example, the quinoline is polymerized 2,2,4-trimethyl-1,2-dihydroquinoline (TMDQ), and the p-phenylenediamine is N-1,3-dimethylbutyl-N'-phenyl-p-phenylenediamine.

The anti-aging agent may include quinoline and p-phenylenediamine at a mass ratio of about 1:0.75 to 1.25.

The amount of the anti-aging agent may be about 4.0 to 10 parts by weight based on 100 parts by weight of the base resin. When the amount of the anti-aging agent is less than about 4.0 parts by weight, the effects thereof may become insignificant. On the other hand, when the amount thereof is greater than about 10 parts by weight, mechanical properties may be deteriorated.

Water-Expandable Rubber Pad

The water-expandable rubber pad may be manufactured using a known method, for example, by mixing the water-expandable rubber composition using a roll mill and performing a molding process using an injection mold or a press in a compression manner.

The water-expandable rubber pad manufactured as above may be adjusted in volume, thereby being optimized for an assembly process and facilitating design, by controlling the amount of the waterstop resin in the water-expandable rubber composition. The volume expansion rate of the water-expandable rubber pad according to the present invention may be about 100 to 150%. When the volume expansion rate thereof falls in the above range, the jacket insert assembled with the rubber pad may be easily inserted into a cylinder jacket without any interference during the assembly process, and moreover, the water-expandable rubber pad may expand so as to come into sufficient contact with the wall surface of the cylinder jacket upon contact with engine coolant in the structure according to design conditions. The volume of the water-expandable rubber pad may be increased upon contact with engine coolant, thereby being optimized for an assembly process and facilitating design.

Moreover, the water-expandable rubber pad may have a Shore hardness of about 83 to 95 HS, tensile strength of about 5 to 15 MPa, and elongation of about 220 to 560%.

The water-expandable rubber pad is rigid enough to be directly inserted into a cylinder jacket even without a metal plate or the like.

Therefore, the water-expandable rubber pad is advantageous because no separate assembly parts are used compared to conventional cases, thus reducing the number of parts and costs, and also because excellent adhesiveness and thus heat retention performance may be exhibited compared to conventional foam rubber, thereby improving engine fuel efficiency.

EXAMPLE

A better understanding of the present invention will be given through the following examples. These examples are set forth to illustrate the present invention but are not to be construed as limiting the scope of the present invention.

Examples 1 to 6 and Comparative Examples 1 to 4: Water-Expandable Rubber Composition and Water-Expandable Rubber Pad Including the Same The components for a base resin, a waterstop resin, a filler, a crosslinking agent, a crosslinking accelerator, a processing aid, and an anti-aging agent were placed in the amounts shown in Tables 1 and 2 below in a Kansai 31 Wonder kneader as a roll mill and mixed. Next, test samples were formed using a compression-molding process as set forth in KS M 6518 5.2 Test Piece (Dumbbell No. 3), thus manufacturing water-expandable rubber pad samples.

TABLE 1

| No. | Base resin (parts by weight) | Filler (parts by weight) | Waterstop resin (parts by weight) | Crosslinking agent (parts by weight) | Crosslinking accelerator (parts by weight) | Processing aid (parts by weight) | Anti-aging agent Quinoline (parts by weight) | Anti-aging agent p-Phenylenediamine (parts by weight) |
|---|---|---|---|---|---|---|---|---|
| Comparative Example 1 | HNBR 100 | 20 | 80 | 1.9 | 3 | 1 | 5 | 2 |
| Example 1 | HNBR 100 | 20 | 90 | 1.9 | 3 | 1 | 5 | 2 |
| Example 2 | HNBR 100 | 20 | 100 | 1.9 | 3 | 1 | 5 | 2 |
| Example 3 | HNBR 100 | 20 | 120 | 1.9 | 3 | 1 | 5 | 2 |
| Comparative Example 2 | HNBR 100 | 20 | 130 | 1.9 | 3 | 1 | 5 | 2 |
| Comparative Example 3 | AEM 100 | 20 | 80 | 1.9 | 3 | 1 | 5 | 2 |
| Example 4 | AEM 100 | 20 | 90 | 1.9 | 3 | 1 | 5 | 2 |
| Example 5 | AEM 100 | 20 | 100 | 1.9 | 3 | 1 | 5 | 2 |
| Example 6 | AEM 100 | 20 | 120 | 1.9 | 3 | 1 | 5 | 2 |
| Comparative Example 4 | AEM 100 | 20 | 130 | 1.9 | 3 | 1 | 5 | 2 |

TABLE 2

| Composition | Component | Trade name | Detail | Manufacturer |
|---|---|---|---|---|
| Base resin | Hydrogenated nitrile butadiene rubber (HNBR) | Zetpol 4320 | ACN content: 18.6% (Low-Temperature Grade), Tg = −37° C. Mooney Viscosity of 70 (100° C.) | ZEON |
| | Ethylene-acrylic rubber (AEM) | Vamac G | Terpolymer of ethylene, methylacrylate and a cure site monomer Mooney Viscosity of 16.5 (100° C.), Tg = −35° C. | Dupont |
| Filler | Carbon black | DENKA BLACK Li-100 | Average particle size of 35 nm, specific surface area of 68 m2/g, urea adsorption of 92 mg/g, apparent density of 0.04 g/ml, pH 9 to 10 | DENKA |
| Waterstop resin | Alkali metal polyacrylate-based polymer | SAP | 2-Propenoic acid homopolymer sodium salt: 92 to 100%, Water: 0 to 8% | LG Chemical |

TABLE 2-continued

| Composition | Component | Trade name | Detail | Manufacturer |
|---|---|---|---|---|
| Crosslinking agent | Amine-based crosslinking agent | ACT 55 | 1,8-Diazabicyclo[5.4.0]undec-7-ene: 40 to 60%, Aliphatic dibasic acids: 20 to 40%, Silicon dioxide: 20 to 40% | Safic-Alcan |
| Crosslinking accelerator | Hexamethylenediamine carbamate (HMDC) | RhenogranHMDC70 | Density of 1.18 g/cm$^3$, Hexamethylene diamine carbamate: 70% AEMD, dispersing and dusting agents: 30% | LANXESS |
| Processing aid | Stearic acid) | St-A | $CH_3(CH_2)_{16}COOH$, melting point of 58° C. or more, water content of 0.5% or less, ash content of 0.01% or less | Dansuk Industrial |
| Anti-aging agent | Quinoline | RD-G | Polymerized 2,2,4-trimethyl-1,2-dihydroquinoline [TMDQ], specific gravity of 1.02, melting point of 80 to 110° C. | Kawaguchi Chemical |
| | P-phenylenediamine | Antage 6c | N-1,3-Dimethylbutyl-N'-phenyl-p-phenylenediamine specific gravity of 1.10, melting point of 45° C. or more | Kawaguchi Chemical |

Measurement of Properties (1) Hardness (KS M6518): Measurement was performed using a Shore A hardness tester. A Shore A hardness tester is used to measure the hardness of a relatively soft elastic body by placing a test sample under a hardness tester for a specific time under a specific load.

(2) Tensile strength and elongation (KS M6518): Force and increased length required to break a test sample were measured.

(3) Expansion rate (%): Using the manufactured test sample, the volume change was measured after immersion aging at a predetermined temperature (80° C.) for a predetermined time (72 hr).

Test Example 1—Expansion Rate and Mechanical Properties of Water-Expandable Rubber Pad

TABLE 3

| No. | Expansion rate (%) 80° C. × 72 hr | Hardness (Shore A) | Tensile strength (MPa) | Elongation (%) |
|---|---|---|---|---|
| Comparative Example 1 | 91 | 78 | 5 | 550 |
| Example 1 | 119 | 83 | 5 | 540 |
| Example 2 | 140 | 86 | 6 | 560 |
| Example 3 | 158 | 92 | 8 | 530 |
| Comparative Example 2 | 179 | 94 | 9 | 480 |
| Comparative Example 3 | 89 | 79 | 11 | 270 |
| Example 4 | 108 | 84 | 12 | 260 |
| Example 5 | 136 | 87 | 13 | 250 |
| Example 6 | 148 | 95 | 15 | 220 |
| Comparative Example 4 | 165 | 97 | 16 | 180 |

As shown in Tables 1 and 3, as the amount of the waterstop resin was increased, the volume expansion rate increased and the hardness and tensile properties were gradually improved. Here, when the amount of the waterstop was 90 to 120 parts by weight, the water-expandable rubber pads including the same (Examples 1 to 6) exhibited high mechanical properties and were thus rigid enough to be directly inserted into a cylinder jacket, even without a metal plate or the like. Moreover, the expansion rate of the water-expandable rubber pads of Examples 1 to 6 was 100 to 150%, satisfying structural requirements according to assembly conditions and design conditions. Since the volume expansion rate of the rubber pad can be adjusted by varying the amount of the waterstop resin, the rubber pad can be manufactured so as to satisfy the expansion rate required for processing conditions and design conditions.

Test Example 2—Evaluation of Fuel Efficiency Using Water-Expandable Rubber Pad

Figure 1:
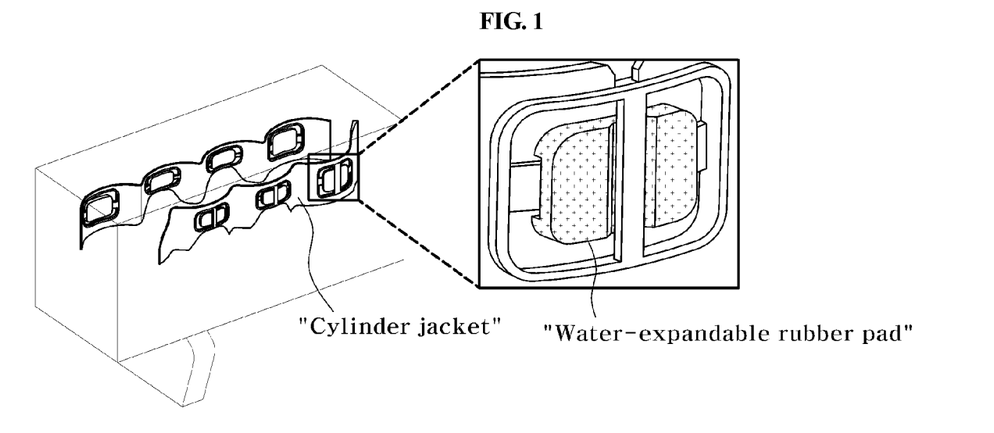
FIG. 1 is a view showing that an exemplary jacket insert assembled using an exemplary water-expandable rubber pad according to an exemplary embodiment of the present invention is inserted into a cylinder jacket.

The jacket insert assembled with the water-expandable rubber pad of each of Example 1 and Comparative Example 1 was inserted into a cylinder jacket as shown in FIG. 1, and 9-point fuel efficiency thereof was evaluated. The results thereof are shown in FIGS. 2A and 2B.

Figure 2A:
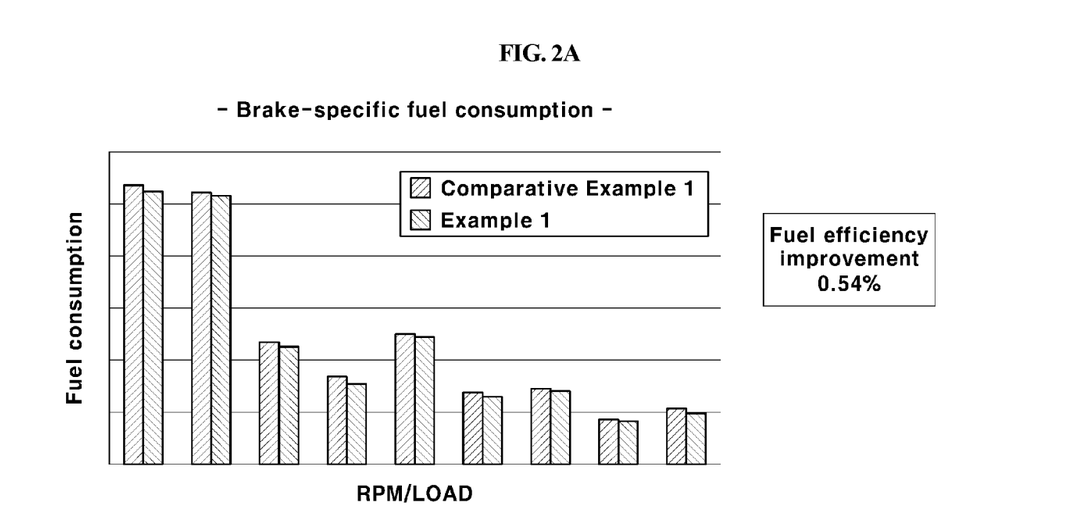
FIG. 2A is a graph showing the brake-specific fuel consumption, represented by 9-point fuel efficiency, after inserting the jacket insert assembled with the water-expandable rubber pad of each of Example 1 and Comparative Example 1 into the cylinder jacket.
Figure 2B:
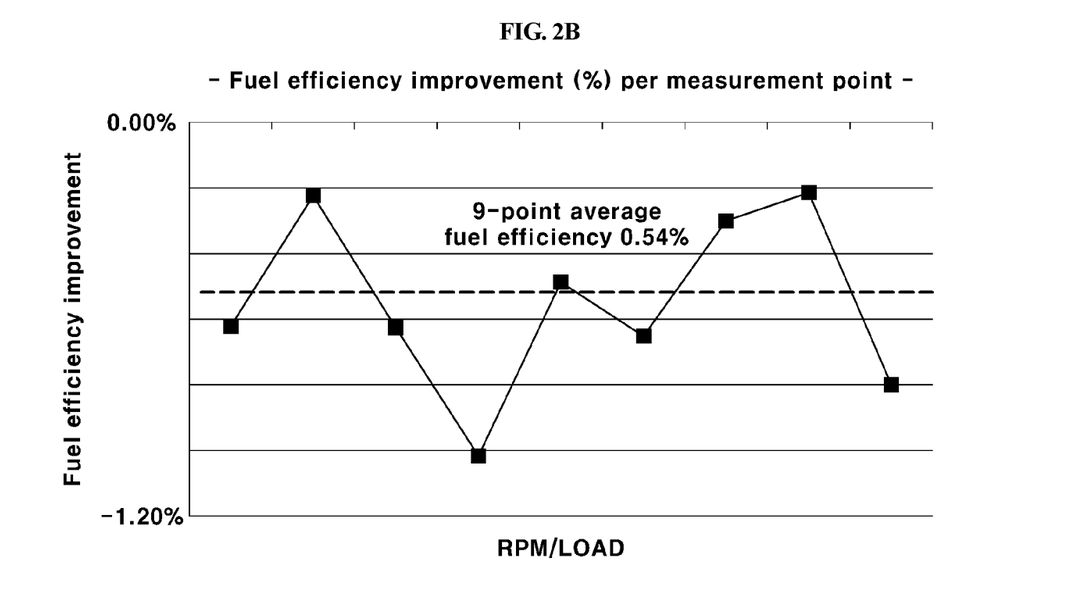
FIG. 2B is a graph showing the fuel efficiency improvement (%) depending on the brake-specific fuel consumption of FIG. 2A.

As shown in FIGS. 2A and 2B, the fuel efficiency was improved in the entire 9-point measurement range, and consequently, it was confirmed that the average fuel efficiency was improved by 0.54%.

The water-expandable rubber pad is rigid enough to be directly inserted into the cylinder jacket, and the volume thereof may be increased, thereby being optimized for an assembly process and facilitating design, and thus, since no separate assembly parts are used compared to conventional cases, the number of parts can be reduced, and costs can be reduced, and moreover, adhesiveness thereof is superior to that of conventional foam rubber, and thus excellent heat retention performance can be obtained, so engine fuel efficiency can be improved.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A water-expandable rubber composition, comprising:
   100 parts by weight of a base resin;
   an amount of 90 to 120 parts by weight of a waterstop resin; and
   an amount of 18 to 22 parts by weight of a filler,
   wherein the base resin comprises hydrogenated nitrile butadiene rubber (HNBR), and
   the hydrogenated nitrile butadiene rubber (HNBR) has a glass transition temperature of −35 to −40° C. and a Mooney viscosity (ML1+4, 100° C.) of 67 to 73 dl/g.

2. The water-expandable rubber composition of claim 1, wherein the hydrogenated nitrile butadiene rubber (HNBR) comprises an amount of 16 to 20 mass % of acrylonitrile (AN) based on the total mass of the hydrogenated nitrile butadiene rubber (HNBR) and has a hydrogen saturation rate of 80 to 99 mass %.

3. The water-expandable rubber composition of claim 1, wherein the waterstop resin comprises an alkali-metal-polyacrylate-based polymer.

4. The water-expandable rubber composition of claim 1, wherein the waterstop resin has a particle size of 3 to 10 μm.

5. The water-expandable rubber composition of claim 1, wherein the filler comprises carbon black.

6. The water-expandable rubber composition of claim 1, wherein the filler has an average particle size of 30 to 40 nm, a specific surface area of 65 to 70 m$^2$/g, urea adsorption of 90 to 95 mg/g, and an apparent density of 0.02 to 0.06 g/mL.

7. The water-expandable rubber composition of claim 1, further comprising, based on 100 parts by weight of the base resin:
   an amount of 0.5 to 2.0 parts by weight of a crosslinking agent;
   an amount of 2.0 to 5.0 parts by weight of a crosslinking accelerator;
   an amount of 0.5 to 2.0 parts by weight of a processing aid; and
   an amount of 4.0 to 10 parts by weight of an anti-aging agent.

8. The water-expandable rubber composition of claim 7, wherein the crosslinking agent comprises an amount of 40 to 60 wt % of 1,8-diazabicyclo[5.4.0]undec-7-ene, an amount of 20 to 30 wt % of aliphatic dibasic acid, and an amount of 20 to 30 wt % of silicon dioxide, based on the total weight of the crosslinking agent.

9. The water-expandable rubber composition of claim 7, wherein the crosslinking accelerator comprises hexamethylenediamine carbamate (HMDC).

10. The water-expandable rubber composition of claim 7, wherein the processing aid comprises stearic acid.

11. The water-expandable rubber composition of claim 7, wherein the anti-aging agent comprises quinoline and p-phenylenediamine at a mass ratio of 1:0.75 to 1.25.

12. A water-expandable rubber pad, comprising the water-expandable rubber composition of claim 1, wherein the water-expandable rubber pad has a volume expansion rate of 100 to 150%, a Shore hardness of 83 to 95 HS, tensile strength of 5 to 15 MPa, and elongation of 220 to 560%.

13. The water-expandable rubber pad of claim 12, used for an engine water jacket.

* * * * *